United States Patent [19]

Harao

[11] 4,245,160

[45] Jan. 13, 1981

[54] IMAGE-INTENSIFIER APPARATUS

[75] Inventor: Norio Harao, Ayase, Japan

[73] Assignee: Tokyo Shibaura Denki Kabushiki Kaisha, Kawasaki, Japan

[21] Appl. No.: 969,827

[22] Filed: Dec. 15, 1978

[30] Foreign Application Priority Data

Dec. 27, 1977 [JP] Japan ................................ 52-156481

[51] Int. Cl.$^3$ ....................... G01N 23/22; H01J 31/50; H01J 1/52

[52] U.S. Cl. .............................. 250/460; 250/213VT; 313/94; 313/239

[58] Field of Search ................ 250/458, 460, 213 VT; 313/94, 313, 239

[56] References Cited

U.S. PATENT DOCUMENTS 3,809,889 5/1974 McBroom ..................... 250/213 VT 4,000,432 12/1976 Coon et al. ................... 250/213 VT

*Primary Examiner*—Alfred E. Smith

*Assistant Examiner*—Janice A. Howell

*Attorney, Agent, or Firm*—Cushman, Darby & Cushman

[57] ABSTRACT

An image intensifier apparatus which comprises an image intensifier for converting incoming radiation into light rays on an input fluorescent screen, further converting said light rays into electron beams on a photocathode, focusing said light rays by an electron lens system and converting said focused light rays into the visible form by an output screen; and a housing which receives the image intensifier and whose inner side wall is fitted with a radiation leakage-preventing layer and first magnetism shielding layer, and wherein second magnetism-shielding layer having a high radiation permeability is formed on any of those portions of the image intensifier apparatus into which radiation is carried.

10 Claims, 6 Drawing Figures

IMAGE-INTENSIFIER APPARATUS

This invention relates to an image intensifier apparatus for converting radiation into a visible light.

Radiation is generally applied, for example, in the field of medical treatment for diagnosis of those parts of a patient which can not be actually observed by the naked eye. This process is practical to project X-rays on the human body taken as a foreground subject and convert an image defined by X-rays which have been modulated by permeation through the foreground subject into the visible form. This image intensifier apparatus comprises an image intensifier and a housing therefore. The image intensifier is formed of glass, provided with an input window at one end and an output window at the other, and remains evacuated. An input screen for converting radiation into electron beams is set in the image intensifier at a point close to the input window. An output screen for converting electron beams into visible light rays is provided in the image intensifier at a point close to the output window. A radiation image entering the input screen is converted into the visible form and appears on the output screen. The image intensifier is used in a state received in the housing. The housing is made of, for example, aluminium. The inner wall of the housing is fitted with a lead plate for suppressing the leakage of radiation and a magnetic-shielding plate for preventing an output image from being distorted by external, for example, terrestrial magnetism.

Hitherto, however, that section of the housing which crosswise intersects radiation entering the input screen, that is, the end plate of said housing which faces the input window of the image intensifier has not been magnetically shielded at all. Consequently it has sometimes happened that a flux of electron beams generated on the input screen and carried to the output screen was disturbed by external, for example, terrestrial magnetism passing through the input screen, thereby distorting an image appearing on the output screen.

With the prior art X-ray image intensifier, the input window generally had as large a diameter as 150 to 400 mm, and the interior of the intensifier was highly evacuated, making it necessary to render the glass plate of the input window as thick as several millimeters. Consequently, radiation entering the input screen was attenuated and scattered by this thick glass plate, leading to a decrease in the gain of said radiation. Further, scattered beams of radiation gave rise to a decline in the contrast of an image appearing on the output screen.

To avoid the attenuation and scattering of radiation by the glass plate, it has been proposed to replace the glass plate of the input window by an aluminum plate having a sufficient mechanical strength to resist a difference between pressure prevailing in the highly evacuated interior of the image intensifier and external atmospheric pressure. However, it has been difficult to hermetically bond the aluminium plate of the input window with the glass plate of an image intensifier body. Further, the aluminium plate which is a nonmagnetic material has failed to suppress the distortion of an image appearing on the output screen which results from X-rays adversely affected by external, for example, terrestrial magnetism.

It is accordingly the object of this invention to provide an image intensifier apparatus which saves the electron beams from the effect of external, for example, terrestrial magnetism, suppresses the distortion of an image appearing on the output screen, and prevents the attenuation and scattering of the electron beams, thereby avoiding a decline in the contrast of an image produced on the output screen.

With an image intensifier apparatus embodying this invention, magnetic-shielding means is provided on a plane crosswise intersecting radiation entering the input screen, for example, the input window or input screen of the image intensifier or on the end plate of the housing of the image intensifier which faces the input window thereof. A magnetic-shielding material should be a substance having a high magnetic permeability and radiation transmission. Where the input window is built of a magnetic-shielding material, it is designed to let the material of the input window have substantially the same thermal expansion coefficient as that of the image intensifier body or, if both materials have different thermal expansion coefficients, use a joint having an intermediate thermal expansion coefficient.

This invention can be more fully understood from the following detailed description when taken in conjunction with the accompanying drawings, in which.

Figure 1:
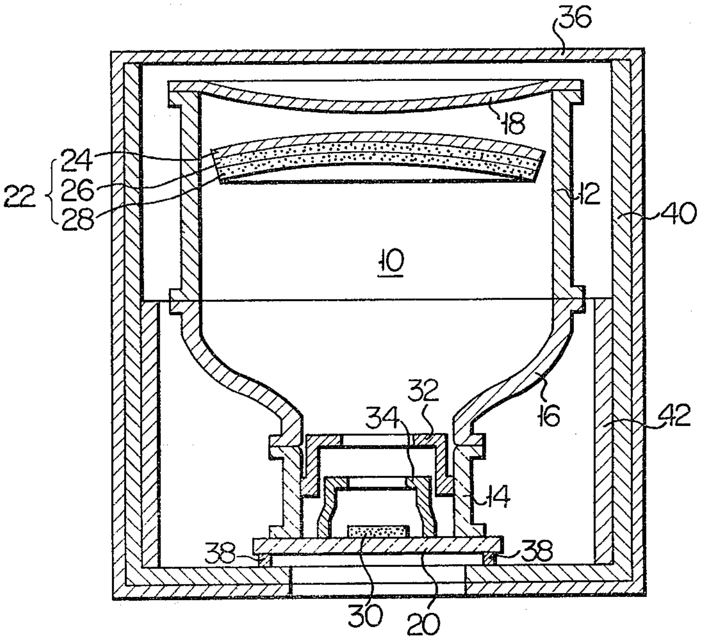
FIG. 1 is a sectional view of an image intensifier apparatus according to one embodiment of this invention.

There will now be described by reference to the accompanying drawing an image intensifier apparatus according to the preferred embodiments of this invention. Now let is be assumed that the radiation used is X-rays. FIG. 1 is a sectional view of an image intensifier apparatus according to one embodiment of this invention. The image intensifier 10 includes a larger diameter section 12, a smaller diameter section 14 and a joint 16 of these sections. A magnetic-shielding substance characterizing this invention is formed of a nickel-iron alloy having a high magnetic permeability. An input window 18 similarly formed of a nickel-iron alloy is welded to the end plate of the larger diameter section 12. The smaller diameter section 14 is made of ceramic or glass. A glass plate constituting an output window 20 is welded to the foremost end of said smaller diameter section 14. The joint 16 is formed of KOVAR (composed of 29% Ni, 17% Co and Fe as the remainder) to effect the bonding of glass or ceramic to metal. The interior of the image intensifier 10 thus constructed is kept in vacuum. The input window 18 is bent inward to ensure a more effective resistance to a difference between atmospheric pressure and pressure prevailing in the highly evacuated interior of the image intensifier 10.

The larger diameter section 12 contains an input screen 22 positioned close to the input window 18. Said input screen 22 consists of an aluminium input substrate 24, input fluorescent layer 26 converting X-rays into light beams and photocathode 28 converting light beams into electron beams laminated in the order mentioned as counted from the input side. The input aluminium substrate 24 is supported on the larger diameter section 12, for example, by pins (not shown). An output fluorescent screen 30 is mounted on the inner wall of the output window 20 provided at the end of the smaller diameter section 14 to act as an electron-light conversion output screen. A first anode electrode 34 and a second anode electrode 32 are coaxially arranged in the smaller diameter section 14 in the order mentioned as counted from the output screen. The larger diameter section 12 concurrently acts as a grid electrode. The image intensifier 10 is received in an aluminium housing 36 and fixed in position, for example, by screws 38. A laminate of a lead plate 40 for preventing the leakage of X-rays and a magnetism-shielding plate 42 for shutting off the intrusion of an external magnetic field is mounted on the inner wall of the image intensifier housing 36. Since the larger diameter section 12 of the image intensifier 10 is made of a magnetic-shielding material, the magnetic-shielding plate 42 has only to be mounted on those portions of the inner wall of the image intensifier housing 36 which face the joint 16 and smaller diameter section 14.

Where the input window 18 of the image intensifier 10 is to be magnetically shielded, the magnetic-shielding material constituting said input window 18 should have a high magnetic permeability, a sufficiently high mechanical strength to resist a difference between pressures inside and outside of the image intensifier and further a property to shut off the intrusion of an external magnetic field. Since magnetic-shielding material is preferred to consist of a $\mu$-metal (for example, composed of 78% Ni, 5% Mo, 2% Cu and Fe as the remainder). This $\mu$-metal has a high magnetic permeability and as small a thermal expansion coefficient as about $120\times10^{-7}$ per C°. The thicker the plate of the input window 18, the greater the magnetic-shielding effect and the mechanical strength, but the lower the X-ray transmission.

With the ordinary image intensifier for medical treatment, the critical X-ray transmission stands at about 0.5 mm as measured in terms of the thickness of the plate of the input window. A plate thicker than this critical value becomes too low in X-ray transmission for practical application.

The larger diameter section 12 of the image intensifier 10 is made of the same type of $\mu$-metal as the plate of the input window 18. However, the larger diameter section 12 better serves the purpose if it has a lower X-ray transmission, and has only to be provided with a magnetic-shielding property. Therefore, the plate of the larger diameter section 12 is desired to have a thickness of at least 1.5 mm.

Figure 2:
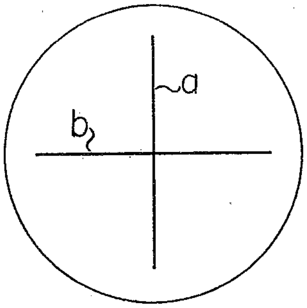
FIG. 2 illustrates a test pattern on an input screen to examine the distortion of an X-ray image produced by an image intensifier apparatus which result from an external magnetic field.
Figure 3:
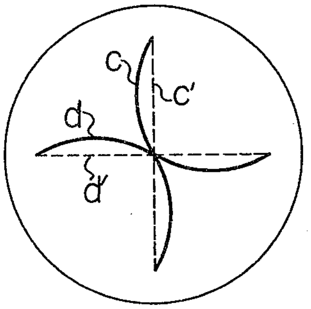
FIG. 3 shows a test pattern on an output screen to examine the distortion of an X-ray image produced by the image intensifier apparatus.
Figure 4:
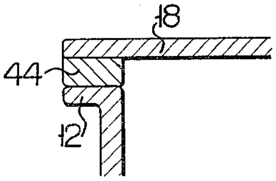
FIG. 4 is a sectional view of the input section of the image intensifier apparatus coupled to the image intensifier body according to another embodiment of the invention.

There will now be described the case where an image of a foreground subject used as a test material is brought into an image intensifier apparatus embodying this invention which is constructed as described above. FIG. 2 shows an image of a cross-shaped foreground subject used as a test material which appeared on the input screen of the image intensifier. The a and b sections of the cross-shaped foreground subject linearly intersect each other at right angles. Where the prior art image intensifier apparatus is used, the sections c, d of an image of the cross-shaped foreground subject appearing on the output screen are distorted in the form of the letter S as illustrated in FIG. 3 under the effect of external, for example, terrestrical magetism. In contrast, where the image intensifier apparatus of this invention is applied, a cross-shaped foreground subject can be reproduced truthfully as indicated by the section C′, d′ of FIG. 3 linearly intersecting each other at right angles.

The smaller diameter section 4 is provided with anode electrodes 32, 34. Photoelectrons accelerated by these electrodes 32, 34 are little affected by an external magnetic field in said smaller diameter section 14. Therefore, omission of the magnetic-shielding material 42 from image intensifier housing 36 facing the smaller diameter portion 14 raises no problem.

The larger diameter section 12 need not be made of the same material as the plate of the input window 18, but will serves the purpose, provided said section 12 is made of a magnetic material which has substantially the same thermal expansion coefficient as the plate of the input window 18 and is transmissible to X-rays.

Where the input window 18 has a large diameter, the end portion of the larger diameter section 12 undergoes great stresses exerted by pressure prevailing in the highly evacuated interior of the image intensifier 10, possibly causing said end portion to be damaged. In such case, therefore, it is preferred that the plate of the input window 18 be welded to the larger diameter section 12, using a metal ring 44 as an insert which has the same thermal expansion coefficiency as, and a larger thickness than, the plate of the input window 18.

Bonding of the plate of the input window 18 to the larger diameter section 12 may be effected not only by welding but also by any other process such as brazing or abutment under pressure, provided vacuum and airtightness can be ensured.

In the foregoing embodiment, the plate of the input window 18 of the image intensifier was made of a magnetic-shielding material. Instead, it is possible to form the input substrate 24 included in the input screen 22 of a magnetic-shielding material. Unlike, the plate of the input window 18, the input substrate 24 need not have a sufficient mechanical strength to resist a difference between pressures inside and outside of the image intensifier 10. Therefore, the magnetic-shielding material of the input substrate 24 can be made thin, as far as the intrusion of an external magnetic field can be shut off. It has been proved that the aforesaid $\mu$-metal even as thin as 0.1 mm thick has an effective magnetic-shielding property.

There will now be described by reference to FIG. 5 an image intensifier apparatus according to another embodiment of this invention. The parts of FIG. 5 the same as those of FIG. 1 are denoted by the same numerals, description thereof being omitted.

Figure 5:
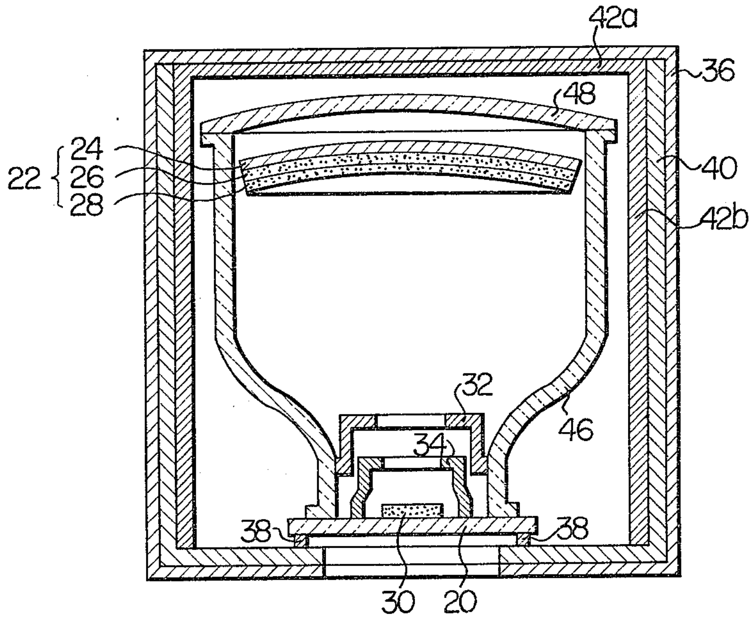
FIG. 5 is a sectional view of an image intensifier apparatus according to still another embodiment of the invention.

The embodiment whose sectional view is given in FIG. 5 includes, like the prior art image intensifier apparatus, a glass intensifier body 46, input window 48 and output window 20. The inner wall of the end plate of the image intensifier housing 36 which faces the input window 48 of the image intensifier and the inner side wall of said housing 36 are respectively fitted with magnetic-shielding plates 42*a*, 42*b* made of $\mu$-metal. With the embodiment of FIG. 5, it is impossible to suppress the attenuation and scattering of X-rays by the glass plate constituting the input window 48. However, this embodiment offers the advantages that during the manufacture of an image intensifier apparatus, it is only required to mount a magnetic-shielding layer having a high transmission to incoming X-rays on the inner side wall of the image intensifier housing 36, thus enabling the prior art image intensifier to be applied without any modification. It is sometimes difficult to directly bond a magnetic-shielding metal plate to the glass body of an image intensifier so as to ensure vacuum in the interior of said image intensifier. In the first embodiment, therefore, it is desgned to effect said bonding with a KOVAR plate used as an insert. The magnetic-shielding plate 42*a* attached to the inner wall of the end plate of the image intensifier housing 36 need not have a sufficient mechanical strength to withstand a difference between atmospheric pressure and pressure prevailing in the evacuated interior of the image intensifier, and consequently can be made thin as far as a magnetic-shielding property can be ensured. For instance, a $\mu$-metal constituting the magnetic-shielding plate 42*a* can effectively shield magnetism, even when it is made as thin as 0.1 mm. On the other hand, the magnetic-shielding plate 42*b* mounted on the inner side wall of the image intensifier housing 36 well serves the purpose at a low X-ray transmission and consequently should be made as thick as at least 1.5 mm.

Figure 6:
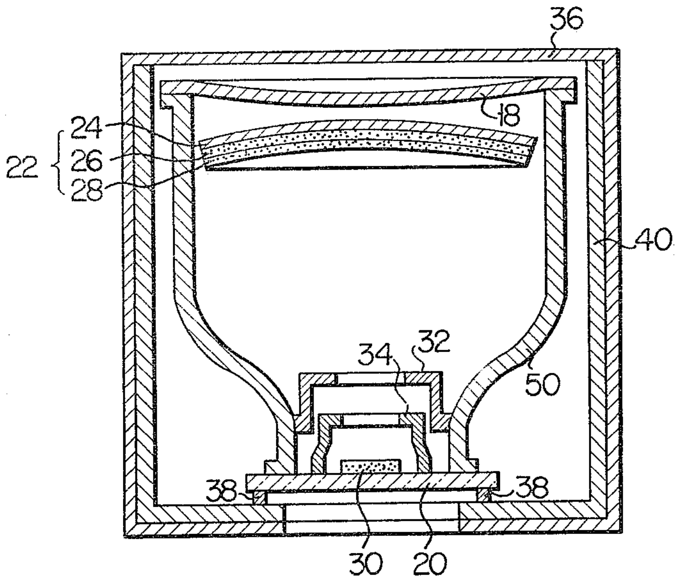
FIG. 6 is a sectional view of an image intensifier apparatus according to a further embodiment of the invention.

There will now be described an image intensifier apparatus according to a further embodiment of this invention, in which the magnetic-shielding $\mu$-metal is directly bonded to the glass body of an image intensifier, by reference to FIG. 6 showing the sectional view of said apparatus. The image intensifier body 50 is formed of magnetic-shielding $\mu$-metal plate 1.5 mm thick. Fitted to both ends of the $\mu$-metal image intensifier body 50 are the $\mu$-metal plate 0.5 mm thick of the input window 18 and the glass plate of the output window 20. If the image intensifier itself is made of such magnetic-shielding $\mu$-metal plate, it well serves the purpose simply to mount a lead plate 40 on the inner side wall of the image intensifier housing 36 for prevention of the leakage of X-rays.

The foregoing embodiments relate to an X-ray image intensifier apparatus. Obviously, this invention is also applicable to the case where radiation consists of gamma rays.

What is claimed is:

1. An image intensifier apparatus having an input side including an input face for receiving a radiation image, and an output side for generating a visible image, comprising:

a magnetic-shielding input window, formed at said input side, including a first magnetic-shielding member covering said input face, for receiving said radiation image therethrough;

a radiation-electron conversion input screen mounted at said input side, behind said input window, said input screen including an input substrate, an input fluorescent layer and a photocathode layer;

an electron-light conversion output fluorescent screen formed at said output side; and a side wall, constituted by a radiation leakage-preventing member and a second magnetic-shielding member, connecting said input window and said output fluorescent screen.

2. An image intensifier apparatus as in claim 1, wherein said first magnetic-shielding member is made of a nickel-iron alloy having a high magnetic permeability.

3. An image intensifier apparatus according to claim 2, wherein the thickness of said first magnetic-shielding member is less than or equal to 0.5 mm.

4. An image intensifier apparatus having an input side including an input face for receiving a radiation image, and an output side for generating a visible image, comprising:

a magnetic-shielding input window formed at said input side, including a first magnetic-shielding member covering said input face, for receiving said radiation image therethrough;

a radiation-electron conversion input screen mounted at said input side behind said input window, said input screen including an input substrate, an input fluorescent layer and a photocathode layer;

an electron-light conversion output fluorescent screen formed at said output side; and a side wall made of a material having a thermal expansion coefficient substantially equal to that of said first magnetic-shielding member and connecting said input window and said output fluorescent screen.

5. An image intensifier apparatus as in claim 4, further comprising an insert of material for bonding said side wall to said input window, said material having a thermal expansion coefficient substantially equal to that of said first magnetic-shielding member.

6. An image intensifier apparatus as in claim 4, wherein said first magnetic-shielding member is made of a nickel-iron alloy having a high magnetic permeability.

7. An image intensifier apparatus as in claim 6, wherein the thickness of said first magnetic-shielding member is less than or equal to 0.5 mm.

8. An image intensifier apparatus having an input side for receiving a radiation image and an output side for generating a visible image, comprising:

a glass input window formed at said input side for receiving said radiation therethrough;

a radiation-electron conversion input screen mounted at said input side and including an input substrate, an input fluorescent layer and a photocathode layer, said input substrate comprising a first magnetic-shielding member;

an electron-light conversion output fluorescent screen formed at said output side; and a glass side wall connecting said input window and said output fluorescent screen.

9. An image intensifier apparatus as in claim 8, wherein said first magnetic-shielding member is made of a nickel-iron alloy having a high magnetic permeability.

10. An image intensifier apparatus according to claim 9, wherein the thickness of said first magnetic-shielding member is less than or equal to 0.5 mm.

* * * * *